United States Patent Office 3,404,561
Patented Oct. 8, 1968

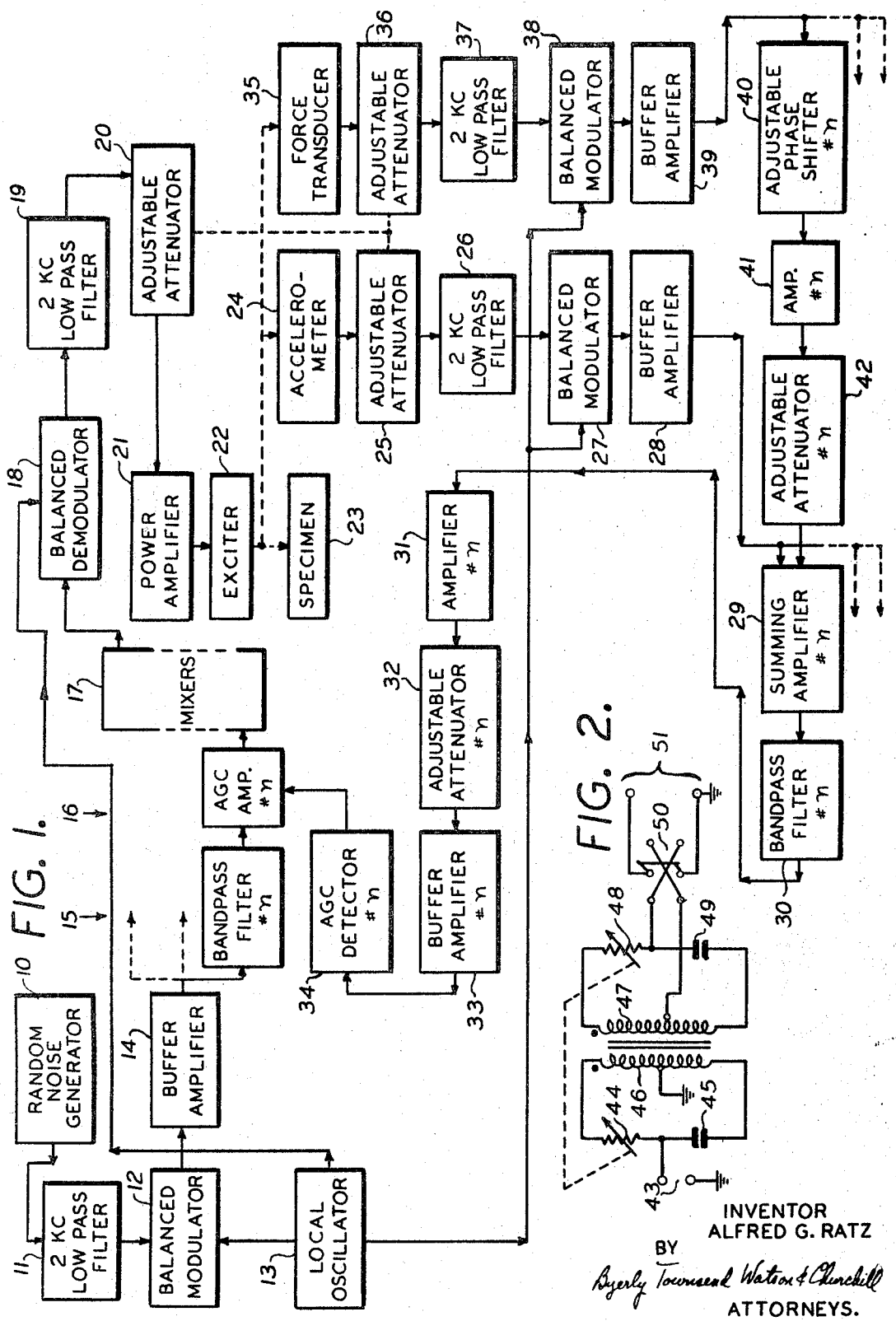

3,404,561
VIBRATION TESTING SYSTEM WITH IMPEDANCE COMPENSATION
Alfred G. Ratz, Woodbridge, Conn., assignor to Textron Electronics, Inc., Providence, R.I., a corporation of Delaware
Filed June 21, 1965, Ser. No. 465,415
5 Claims. (Cl. 73—71.6)

ABSTRACT OF THE DISCLOSURE

The output signal from a force transducer coupled to a shaker is fed through a separate adjustable phase shifter and adjustable attenuator for each of a plurality of adjacent frequency band feedback channels and added to the main feedback signals in said channels. The main feedback signals are derived from the usual accelerometer on the shaker, and the augmented signals are applied to the automatic gain control amplifiers in the corresponding adjacent frequency band channels between the source of test signal and the shaker. Compensation for mechanical impedance characteristics is afforded in addition to spectrum equalization.

---

The present invention relates to vibration testing equipment and particularly to such equipment operating with random noise signals in the audio or near audio frequency range.

In United States Letters Patent No. 3,157,045 issued Nov. 17, 1964, there is described a fully automatic system for equalization of the resonance phenomena in a random motion system. As explained therein a random noise signal is subdivided into adjacent narrow frequency band channels by a plurality of narrow bandpass filters, passed through individual automatic gain control amplifiers, recombined, and used to drive an exciter. A signal is produced as a function of the acceleration of the exciter table, this signal is subdivided into corresponding adjacent narrow frequency band channels by a duplicate bank of narrow bandpass filters, modified in amplitude as described, and used to control the gain control amplifiers in the forward feed channels. In this manner the acceleration spectral density is caused to assume a desired pattern or characteristic independent of resonance effects in the system or specimen.

When the system described in the aforesaid patent is to be used it is necessary to ascertain in advance the desired spectral density characteristic. A presently accepted procedure for determining such characteristic for an actual situation is to measure the no-load acceleration versus frequency appearing at the actual mounting site for the particular specimen to be tested. However, such approach overlooks the influence of mechanical impedance.

The object or specimen under test will, when installed in its ultimate environment, influence such environment in a way dependent upon the complex ratio of its mechanical impedance to that of the driving or mounting structure. Hence, for accurate reproduction of the environment it is necessary to take into account the impedance of the mounting site and compensate for same.

For example, assume a practical problem wherein it is desired to test a number of satellites to be ultimately projected into space by a particular rocket. The rocket can be fired and the acceleration spectral density versus frequency measured and plotted at the satellite mounting point for the no-load condition. Then with a known load secured to the rocket, the mechanical impedance looking into the source can be measured, providing plots of amplitude and phase angle versus frequency.

The present invention provides, by way of improvement over the automatic equalization system described in Patent No. 3,157,045, a system wherein both the mechanical impedance and spectral density characteristics can be compensated for simultaneously. In this way, any number of different satellites can be tested without error and without altering the adjustment of the shaker equipment.

Thus, in a vibration testing system having automatic equalization wherein the signals in a plurality of given frequency bands supplied to a vibration exciter are individually controlled by an automatic gain control feedback circuit for each such frequency band for regulating the overall acceleration spectral density, there is included means for providing a signal as a function of the force exerted by said exciter upon a specimen, means for adjustably shifting the phase and changing the amplitude of said last-mentioned signal separately for each of said feedback circuits, and means coupling the output of said last-mentioned means separately to each of said feedback circuits for augmenting the feedback signals therein.

The invention will be better understood after reading the following detailed description of a presently preferred embodiment thereof with reference to the accompanying drawings in which:

FIGURE 1 is an electrical schematic block diagram of the basic components constituting an equalization system embodying the present invention; and FIGURE 2 is a schematic circuit diagram of an adjustable phase shifter that can be employed in the circuit of FIGURE 1.

Referring to FIGURE 1, a random noise generator 10 has its output fed through a low pass filter 11, having a substantially flat pass band from zero to 2 kc., to a balanced modulator 12 supplied with a carrier signal from the local oscillator 13. The low pass filter 11 eliminates all undesired frequencies in order that subsequent amplifier stages will not be overloaded and can be efficiently designed.

The balanced modulator 12 provides a suppressed carrier output. Conveniently, the local oscillator 13 is arranged to operate at 100 kc. Thus, the sideband output of the modulator 12 is passed through a buffer amplifier 14 to a bank 15 of narrow bandpass filters. The drawing illustrates the general case wherein $n$ filter channels are employed with only the components of the $n$th channel being shown.

By way of example, there may be 80 filters, each having a band width of 25 c.p.s. and with uniformly spaced center frequencies. That is, filter #1 will have a center frequency of 100,025 c.p.s., filter #2 will have a center frequency of 100,050 c.p.s. and so on until filter #80 which will have a center frequency of 102,000 c.p.s. The actual frequency band covered by these filters extends from about 100,012 c.p.s. to approximately 102,012 c.p.s. However, it is not an absolute requirement that the band be divided into 80 parts or that divisions be of equal band width.

The signals leaving the filters of the bank 15 are selected from the upper sidebands supplied by the modulator 12 while the lower sidebands are suppressed. The output of bandpass filter #$n$ in bank 15 is fed through an automatic gain control amplifier (A.G.C.) #$n$ in a bank 16 to the mixing circuit 17. While not shown it will be understood that there is a separate bandpass filter and A.G.C. amplifier for each adjacent narrow frequency band channel between the amplifier 14 and mixing circuit 17.

The output of the mixing circuit 17 is supplied to the balanced demodulator 18 which is coupled to the local oscillator 13. The output of demodulator 18 is supplied through a 2 kc. low pass filter 19, an adjustable attenuator 20, and power amplifier 21 to the exciter 22.

A specimen 23 is shown coupled to the exciter 22. Also coupled to the exciter is an accelerometer 24 which has its output coupled through adjustable attenuator 25 and 2 kc. low pass filter 26 to balanced modulator 27, the latter being supplied with a carrier signal from oscillator 13.

The output of the balanced modulator 27, in the same frequency range as the output of modulator 12, is fed through buffer amplifier 28 to a second group of signal channels corresponding in number to the channels between modulator 12 and mixing circuit 17. Each of the channels in the second group are similar to the illustrated $n$th channel differing only in the center frequency of its pass band. Channel #$n$ contains a summing amplifier 29 feeding bandpass filter 30. The output of filter 30 is supplied through amplifier 31 to an adjustable attenuator 32, then through buffer amplifier 33 to automatic gain control (A.G.C.) detector 34. The output of detector 34 is coupled to the corresponding A.G.C. amplifier in bank 16.

The bandpass filter 30 may be identical to the filter #$n$ in bank 15. Similarly each of the filters in bank 15 will have a corresponding filter in the bank containing filter 30.

As described so far, the circuit, with the exception of the summing amplifier 29, is identical to that described in greater detail in the aforementioned patent.

In accordance with the present invention, a force transducer 35 is mounted on the exciter table and arranged to feed a signal through adjustable attenuator 36 to 2 kc. low pass filter 37. Attenuator 36 is ganged to and operates in parallel with attenuator 25 while both operate in reciprocal relation to attenuator 20. The signal from the force transducer when a specimen is coupled to the exciter will be a function of the force exerted upon the specimen.

The output of filter 37 is supplied to balanced modulator 38 supplied with the 100 kc. signal from oscillator 13. Hence, the output of the force transducer is shifted in frequency in the same manner as the accelerometer output.

From modulator 38 the signal is fed through buffer amplifier 39 to a bank of $n$ adjustable phase shifters such as 40, amplifiers such as 41, and adjustable attenuators such as 42. The output from the attenuator 42 is coupled to summing amplifier 29. In similar manner the output from the other attenuators (not shown) would be coupled to the corresponding summing amplifiers (not shown).

Each channel containing a phase shifter and attenuator such as 40 and 42 corresponds to a different narrow frequency band having a discrete center frequency. Thus, the attenuator may be set as a function of the amplitude, and the phase shifter as a function of the phase angle of the impedance of the mounting environment at the particular center frequency.

The adjustable attenuators in the bank containing attenuator 42 may be linear or logarithmic. Conveniently, they can be identical to the corresponding attenuators in the bank containing attenuator 32.

The summing amplifier 29 and the other summing amplifiers should have a gain of 2.

The adjustable phase shifters in the bank containing phase shifter 40 may take the form shown in FIGURE 2. When frequency shifting is employed as shown in FIGURE 1 all of the phase shifters may be identical.

Referring to FIGURE 2, the input to the phase shifter is at 43 and is connected through an adjustable resistor 44 and a capacitor 45 to the primary transformer winding 46 whose center-tap is grounded. The secondary winding 47 is connected to a second variable resistor 48 and capacitor 49 and to a phase reversing switch 50, then to output terminals 51. Resistors 44 and 48 are ganged for conjoint operation. The circuit of FIGURE 2 represents a simple and inexpensive network for producing a smooth phase shift of plus and minus 90° for a total shift of 180°.

FIGURE 1 illustrates the invention as applied to a system wherein the filtering is accomplished at an elevated frequency attained by frequency shifting techniques. However, it can also be applied to systems wherein the filtering is accomplished at audio frequencies. In such case the center frequencies between adjacent channels will differ sufficiently percentagewise as to require a differently proportioned phase shifter for each center frequency.

When the system of FIGURE 1 is employed using a carrier or local oscillator frequency of 100 kc., typical circuit constants for the phase shifter in FIGURE 2 may be as follows:

Capacitors 45 and 49 _____ Each 500 mmf.
Resistors 44 and 48 _____ Each adjustable from 1.27K to 7.44K ohms.

The foregoing values are based upon an assumed R–C time constant at 0° phase shift of $5/\pi$ microseconds. For 0° phase shift, resistors 44 and 48 should have a value of about 3.1K ohms.

Force transducer 35 may take any well known form. Under certain conditions of operation, particularly at frequencies below 500 c.p.s. it is possible to utilize the current fed to the exciter as a measure of output force. In such case the signal supplied to attenuator 36 may be derived from the power amplifier 21. However, the use of a good transducer designed especially for measuring force is presently preferred.

While a particular phase shifter has been illustrated in FIGURE 2, it will be understood that any good phase shifting circuit, network, or device may be employed.

The invention has now been described with reference to the presently preferred embodiment thereof. It will be understood by those skilled in the art that changes may be made therein without departing from the true spirit of the invention as defined in the appended claims.

What is claimed is:

1. In a vibration testing system having automatic equalization wherein the signals in a plurality of given frequency bands supplied to a vibration exciter are individually controlled by an automatic gain control feedback circuit for each frequency band for regulating the acceleration spectral density, the improvement which comprises means for providing a signal as a function of the force exerted by said exciter upon a specimen, means for selectably shifting the phase and changing the amplitude of said last-mentioned signal separately for each of said feedback circuits, and means coupling the output of said last-mentioned means separately to each of said feedback circuits for augmenting the feedback signals therein and thereby providing adjustable compensation for mechanical impedance characteristics.

2. A vibration testing system comprising a source of random noise signals having a given bandwidth; a mixing circuit; a first group of signal channels coupled between said source and said mixing circuit, said channels each having a frequency selective input for collectively dividing the signals of said given bandwidth into a plurality of adjacent narrow frequency bands; a separate automatic gain control device in each of said channels between the corresponding frequency selective input and said mixing circuit; a vibration exciter; means for energizing said exciter with the output from said mixing circuit; force transducer means coupled to said exciter for providing a signal as a function of the force exerted by said exciter upon a specimen; a second group of signal channels equal in number to said first group and each coupled between an output of said force transducer means and a gain controlling input of a different one of said gain control devices, each of said second group of channels having in sequence from said force transducer means to the associated automatic gain control device adjustable phase shifter and attenuator means, summing means, a frequency selective device for selecting and passing the same narrow frequency band as carried by the associated channel in said first group, and an adjustable attenuator and detecting circuit; and an electro-mechanical transducer coupled to said exciter for providing a signal as a function of exciter motion, the output of said last-mentioned transducer being coupled in parallel to an input of each of said summing means.

3. A vibration testing system according to claim 2, wherein said electro-mechanical transducer is an accelerometer.

4. A vibration testing system according to claim 3, further comprising frequency changing means coupled before said channels of said first and second groups, between said accelerometer and said summing means, and after said mixing circuit for maintaining the input to said exciter within the same frequency range as said source of noise signals while causing the channel signal frequencies to lie above said frequency range.

5. A vibration testing system according to claim 2, further comprising three adjustable attenuators ganged such that the first one of said three operates in reciprocal relation to the other two, said first one being coupled between said mixing circuit and said exciter, the other two being coupled each between a different one of said transducers and said second group of channels.

References Cited

UNITED STATES PATENTS 3,157,045  11/1964  Maki _____ 73—71.6

RICHARD C. QUEISSER, *Primary Examiner.*

JOHN P. BEAUCHAMP, JR., *Assistant Examiner.*